US009787098B2

(12) United States Patent
Choi et al.

(10) Patent No.: US 9,787,098 B2
(45) Date of Patent: Oct. 10, 2017

(54) ENERGY STORAGE SYSTEM AND METHOD TO IMPROVE ENERGY EFFICIENCY OF THE SYSTEM

(71) Applicant: KOREA POLYTECHNIC UNIVERSITY INDUSTRY ACADEMIC COOPERATION FOUNDATION, Gyeonggi-do, Siheung-si (KR)

(72) Inventors: Jinku Choi, Seoul (KR); Chang-Woo Lee, Suwon-si (KR)

(73) Assignee: Korean Polytechnic University Industry Academic Cooperation Foundation, Siheungi-Si, Gyeonggi-Do (KR)

( * ) Notice: Subject to any disclaimer, the term of this patent is extended or adjusted under 35 U.S.C. 154(b) by 119 days.

(21) Appl. No.: 15/015,418

(22) Filed: Feb. 4, 2016

(65) Prior Publication Data
US 2016/0322837 A1    Nov. 3, 2016

(30) Foreign Application Priority Data

Apr. 29, 2015   (KR) .................. 10-2015-0060532

(51) Int. Cl.
*H02J 7/00*  (2006.01)
*H02J 1/12*  (2006.01)
*H02J 3/32*  (2006.01)
*H02J 3/38*  (2006.01)
*H02J 7/34*  (2006.01)

(52) U.S. Cl.
CPC ............... *H02J 3/32* (2013.01); *H02J 3/382* (2013.01); *H02J 7/34* (2013.01); *Y02E 70/30* (2013.01)

(58) Field of Classification Search
CPC .......................................................... H02J 9/00
USPC ................................................... 320/132
See application file for complete search history.

(56) References Cited

U.S. PATENT DOCUMENTS 9,519,878 B2 * 12/2016 Sankar ................ G06F 1/305
                                                       713/324
2014/0025220 A1 * 1/2014 Carlson ............ H01L 31/02021
                                                       700/296

* cited by examiner

*Primary Examiner* — Edward Tso
*Assistant Examiner* — Ahmed Omar
(74) *Attorney, Agent, or Firm* — Workman Nydegger

(57) ABSTRACT

An energy storage system (ESS) includes a battery pack, a power converter, a battery management system (BMS) configured to control and monitor, in real time, the battery pack, a load power controller coupled to the battery pack and an external power source, connected to loads, and an integrated controller configured to control an operation of each component, determine an exclusive supply initiation time based on energy management schedule information including the exclusive supply initiation time, an exclusive supply termination time, and power supply timing information, control power to be supplied to the loads exclusively using power of the battery pack at the exclusive supply initiation time, and, when a current residual charge amount of the battery pack is at least one residual charge amount in the power supply timing information, control power supply to one of the loads set to correspond to the residual charge amount to be cut.

10 Claims, 6 Drawing Sheets

ENERGY STORAGE SYSTEM AND METHOD TO IMPROVE ENERGY EFFICIENCY OF THE SYSTEM

CROSS-REFERENCE TO RELATED APPLICATION(S)

This application claims the priority benefit of Korean Patent Application No. 10-2015-0060532, filed on Apr. 29, 2015, in the Korean Intellectual Property Office, the disclosure of which is incorporated herein by reference.

BACKGROUND

1. Field of the Invention

Example embodiments relate to an energy storage system (ESS), and more particularly, to an ESS for supplying power to a plurality of loads, for example, load devices, and a method of improving an energy efficiency of the ESS.

2. Description of the Related Art

A smart grid is an energy-saving electrical power grid that may contribute to solving issues of energy security and global warming. The smart grid may reduce an amount of wasted energy by improving an energy efficiency, reduce a level of energy dependence on foreign countries by activating power distribution based on new and renewable energy, and decrease emissions of green-house gases by reducing use of fossil fuels used in an existing generating installations.

Recently, interest in an energy storage system (ESS) has been growing as a core part of the smart grid because the ESS may maximize efficiencies in storing power and using energy, and a quality of power.

The ESS may reduce a cost for power supply and use energy more efficiently by storing, in a battery such as a lithium ion battery, a nickel battery, and a lead storage battery, power supplied by a commercial power source or by a generation system such as a solar energy system, in a light load state in a house, a school, a workplace, and the like, and then by supplying the stored power when a load consumes a great amount of power.

In such an ESS, power supply may need to be controlled in preparation for a potential occurrence of a situation in which an amount of power to be supplied to a load is insufficient depending on a location and an environment in which the ESS is used. For example, when supplying power stored in a battery to a plurality of loads in lieu of a single load, power supply may need to be controlled to continuously supply power to a load that requires power.

SUMMARY

An aspect provides an energy storage system (ESS) for controlling power supply to continuously supply power to at least one load requiring power based on a state of power supply, and a method of improving an energy efficiency of the ESS.

According to an aspect, there is provided an ESS including a battery pack configured to store power through a charging operation and discharge the stored power through a discharging operation, a power converter configured to convert a form of power input from an external power source to a form of power suitable for the battery pack or loads and then output the power, or to convert a form of power input from the battery pack to a form of power suitable for the loads and then output the power, a battery management system (BMS) configured to control the charging or the discharging operation of the battery pack and monitor, in real time, an amount of residual charges in the battery pack (or simply referred to as a residual charge amount of the battery pack), a load power controller coupled to the battery pack and the external power source, connected to the loads, and configured to selectively supply input power to at least one of the loads based on a switching operation, and an integrated controller configured to control an operation of each component, determine an exclusive supply initiation time based on energy management schedule information including the exclusive supply initiation time, an exclusive supply termination time, and power supply timing information, control power to be supplied to the loads exclusively using power of the battery pack at the exclusive supply initiation time, and, in response to a current residual charge amount of the battery pack being at least one residual charge amount in the power supply timing information, control power supply to one of the loads set to correspond to the residual charge amount.

The power supply timing information may include an order of loads among the loads for which power supply is to be cut based on a residual charge amount of the battery pack, and the order may be set by a user. In such a case, the integrated controller may control power supply to a load having a lower priority to be cut in response to a greater residual charge amount based on the power supply timing information.

According to another aspect, there is provided a method of improving an energy efficiency of an ESS, the method including supplying power of a battery pack to loads at an exclusive supply initiation time of energy management schedule information in which a current time is prestored, determining a current residual charge amount of the battery pack, comparing the current residual charge amount to at least one set residual charge amount in the power supply timing information and determining presence or absence of a residual charge amount corresponding to the current residual charge amount, controlling power supply to one of the loads set to correspond to the corresponding residual charge amount to be cut in response to a determination of the presence of the corresponding residual charge amount, and continuously cutting power supply to one of the loads by repetitively performing the comparing and the determining until the exclusive supply termination time arrives. The exclusive supply initiation time refers to a time at which power supply to a load using only the battery pack is initiated, and the exclusive supply termination time refers to a time at which the power supply to the load using only the battery pack is terminated.

According to still another aspect, there is provided a method of improving an energy efficiency of an ESS, the method including supplying power of a battery pack to loads at an exclusive supply initiation time of energy management schedule information in which a current time is prestored, generating power supply timing information based on a residual charge amount of the battery pack, a power consumption of each load, and an exclusive supply termination time, determining a current residual charge amount of the battery pack, comparing the current residual charge amount to at least one set residual charge amount in the power supply timing information and determining presence or absence of a residual charge amount corresponding to the current residual charge amount, cutting power supply to one of the loads in response to a determination of the presence of the residual charge amount corresponding to the current residual charge amount, and continuously cutting power supply to one of the loads by repetitively performing the cutting of the power supply until the exclusive supply termination time arrives.

The generating of the power supply timing information may include determining a total residual charge amount of the battery pack, determining a first total power consumption by calculating a sum of respective power consumptions of the loads, determining a first residual charge amount required to supply power to all the loads based on the first total power consumption and matching the first residual charge amount to a load having a lowest priority among the loads, determining a second total power consumption required by a first load having a highest priority among the loads for a remaining period of time until the exclusive supply termination time arrives based on a power consumption of the first load and the remaining period of time, determining a second residual charge amount corresponding to the second total power consumption and matching the second residual charge amount to the first load, and performing, on a second load having a second highest priority, an operation similar to the determining of the second total power consumption and the determining of the second residual charge amount and matching a third residual charge amount to the second load.

Here, the loads may be of a same power type, or at least one of the loads may be of a different power type. In addition, the loads may have equal power consumptions or at least one of the loads may have a different power consumption.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
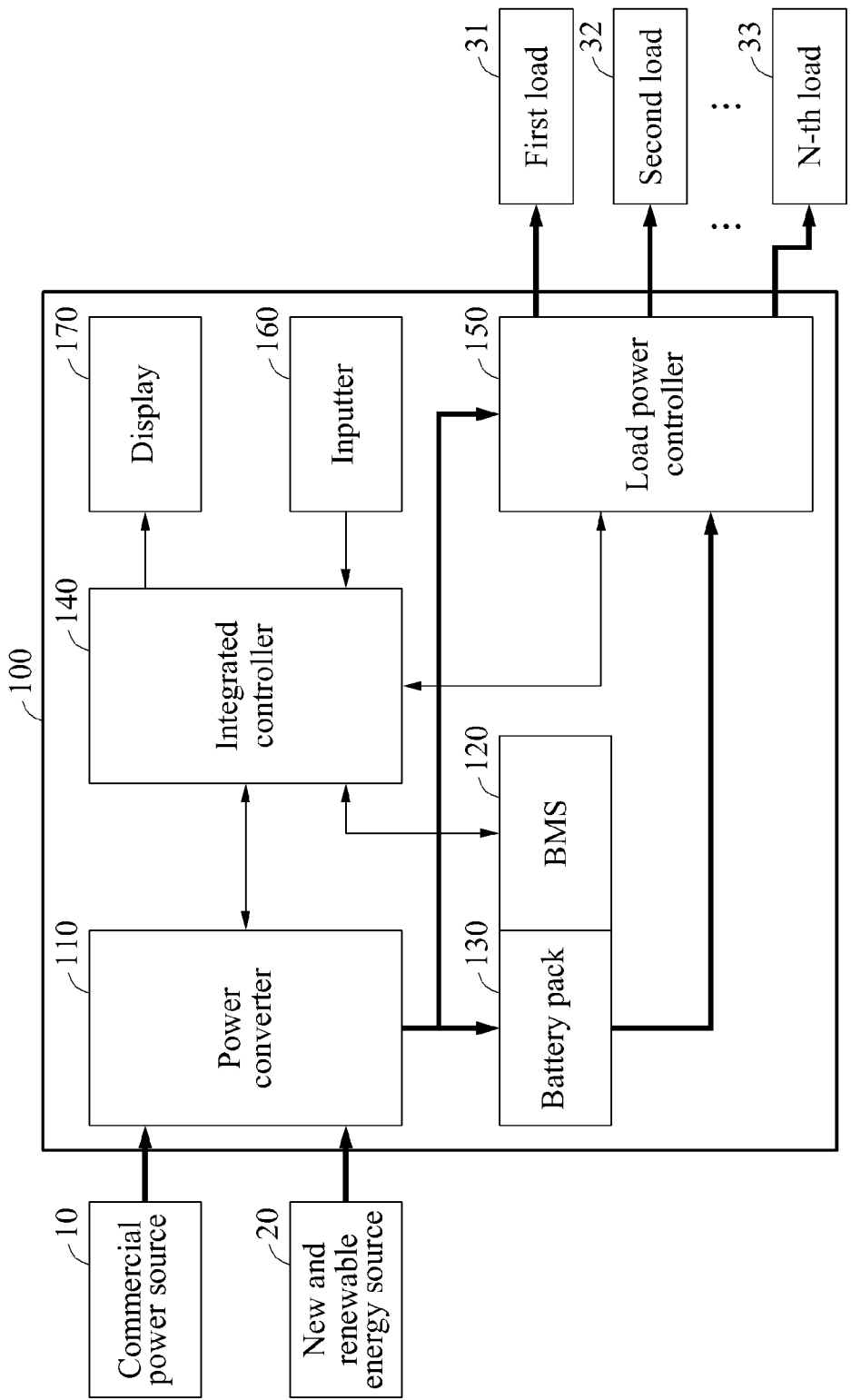
FIG. 1 is a diagram illustrating an energy storage system (ESS) according to an embodiment.

Hereinafter, reference will now be made in detail to examples with reference to the accompanying drawings, wherein like reference numerals refer to like elements throughout. Here, the examples are not construed as limited to the present disclosure and should be understood to include all changes, equivalents, and replacements within the idea and the technical scope of the present disclosure.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Terms such as first, second, A, B, (a), (b), and the like may be used herein to describe components. Each of these terms is not used to define an essence, order or sequence of a corresponding component but used merely to distinguish the corresponding component from other component(s).

For example, a first component may be referred to as a second component without departing from the scope of the disclosure, and likewise the second component may be referred to as the first component.

In addition, as used herein, the term "and/or" includes any and all combinations of one or more of the associated listed items.

It should be noted that if it is described in the present disclosure that one component is "connected," "coupled," or "joined" to another component, a third component may be "connected," "coupled," and "joined" between the first and second components, although the first component may be directly connected, coupled, or joined to the second component.

In contrast, when a component is referred to as being "directly attached to" or "directly connected to" another component, there are no intervening components present therebetween.

The terminology used herein is for the purpose of describing particular examples only and is not to be limiting of the examples.

As used herein, the singular forms "a," "an," and "the" are intended to include the plural forms as well, unless the context clearly indicates otherwise. It will be further understood that the terms "include/comprise" and/or "have" when used in this disclosure, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which the examples belong.

It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, an energy storage system (ESS) and a method of improving an energy efficiency of the ESS will be described in detail with reference to the accompanying drawings.

Figure 3:
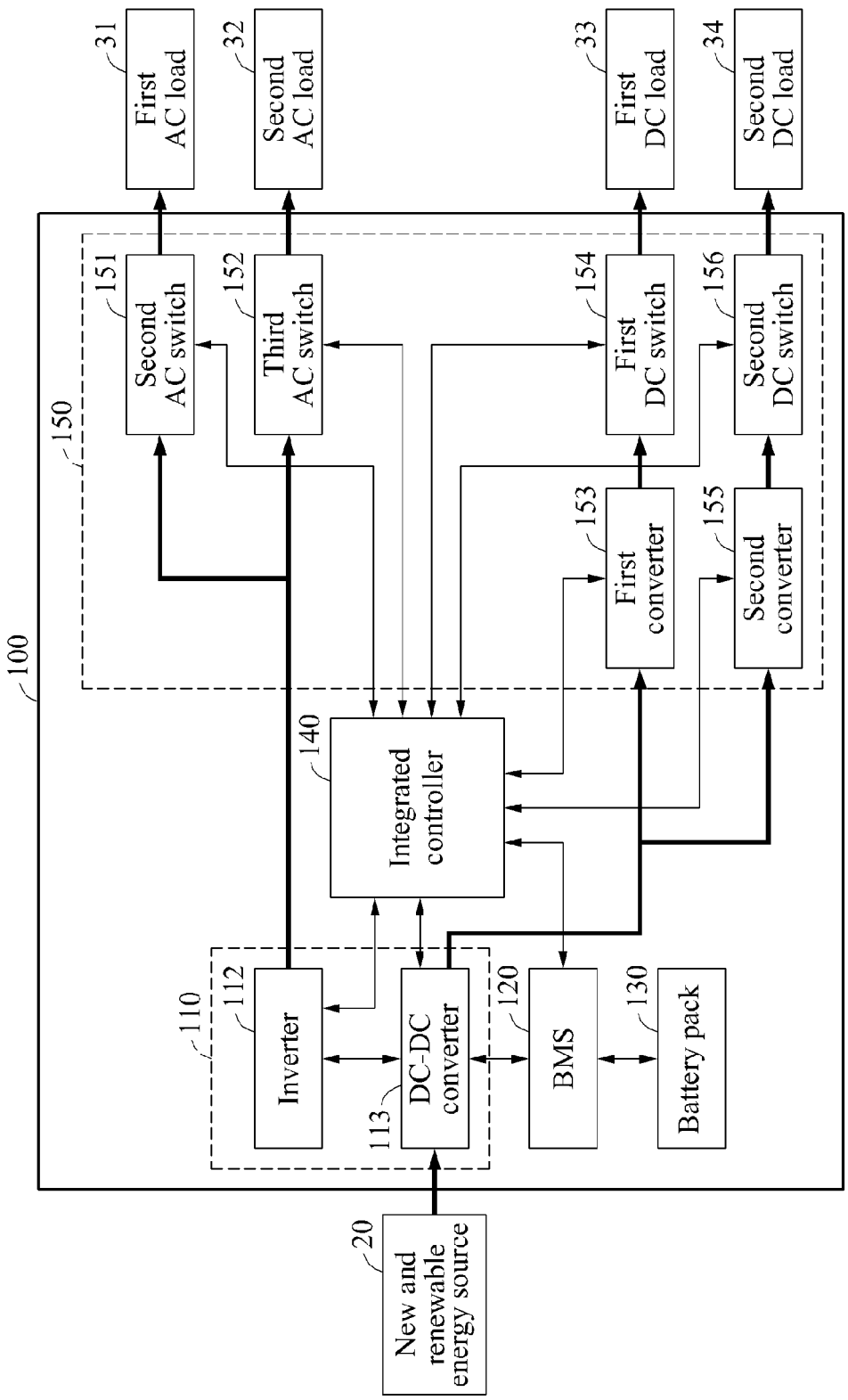
FIG. 3 is a detailed diagram illustrating another example of an ESS according to an embodiment.

FIG. 1 is a diagram illustrating an ESS 100 according to an embodiment. According to an example embodiment, as illustrated in FIG. 1, the ESS 100 may receive power from a commercial power source 10 and also from a new and renewable energy source 20 (hereinafter simply referred to as a renewable energy source 20) using natural resources, for example, solar energy, wind power, and tidal power. According to another example embodiment, the ESS 100 may receive power exclusively from the commercial power source 10, or exclusively from the renewable energy source 20 as illustrated in FIG. 3.

Referring to FIG. 1, the ESS 100 includes a power converter 110, a battery management system (BMS) 120, a battery pack 130, an integrated controller 140, a load power controller 150, an inputter 160, and a display 170.

The power converter 110 may convert, to a form of power suitable for the battery pack 130 or a load, a form of power to be input from at least one of the commercial power source 10 and the new and renewable energy source 20, which are externally disposed.

The BMS 120, which is connected to the battery pack 130, may control a charging operation and a discharging operation of the battery pack 130, determine an abnormality of the battery pack 130, a charging time and a discharging time of the battery pack 130, and power of the battery pack 130, for example, an amount of residual charges in the battery pack 130 (hereinafter simply referred to as a residual charge amount of the battery pack 130), and inform the integrated controller 140 of a result of the determining.

The battery pack 130 may perform the charging or the discharging operation under the control of the BMS 120. Through the charging operation, the battery pack 130 may be charged by receiving power supplied by the commercial power source 10 and/or the renewable energy source 20 through the power converter 110. In addition, through the discharging operation, the battery pack 130 may supply stored power to a plurality of loads, for example, a first load 31, a second load 32, and an n-th load 33, through the load power controller 150.

The integrated controller 140 may control an operation of each component, and control a power transfer path through which power supplied by the commercial power source 10 or the renewable energy source 20 is transferred based on a set schedule. For example, the integrated controller 140 may control the power converter 110 and the BMS 120 based on the set schedule to allow power of the commercial power source 10 to be directly supplied to the loads 31 through 33, control the power converter 110 and the BMS 120 to charge the battery pack 130 with power of the commercial power source 10 and/or the renewable energy source 20, or control the power converter 110 and the BMS 120 to allow power of the battery pack 130 to be supplied to each of the loads 31 through 33. The integrated controller 140 may control the power converter 110 and the BMS 120 to allow power of the commercial power source 10 and power of the battery pack 130 to be supplied to each of the loads 31 through 33, or allow power of the renewable energy source 20 and power of the battery pack 130 to be supplied to each of the loads 31 through 33.

In addition, when operating each of the loads 31 through 33 exclusively using power of the battery pack 130, the integrated controller 140 may control an operation of the load power controller 150 based on a residual charge amount of the battery pack 130, and selectively supply power to the loads 31 through 33. That is, the integrated controller 140 may control power not to be supplied to at least one of the loads 31 through 33 based on the residual charge amount. Such an operation of controlling power not to be supplied to at least one of the loads 31 through 33 may be performed based on energy management schedule information.

Here, the energy management schedule information includes an exclusive supply initiation time, an exclusive supply termination time, and power supply timing information.

Figure 6:
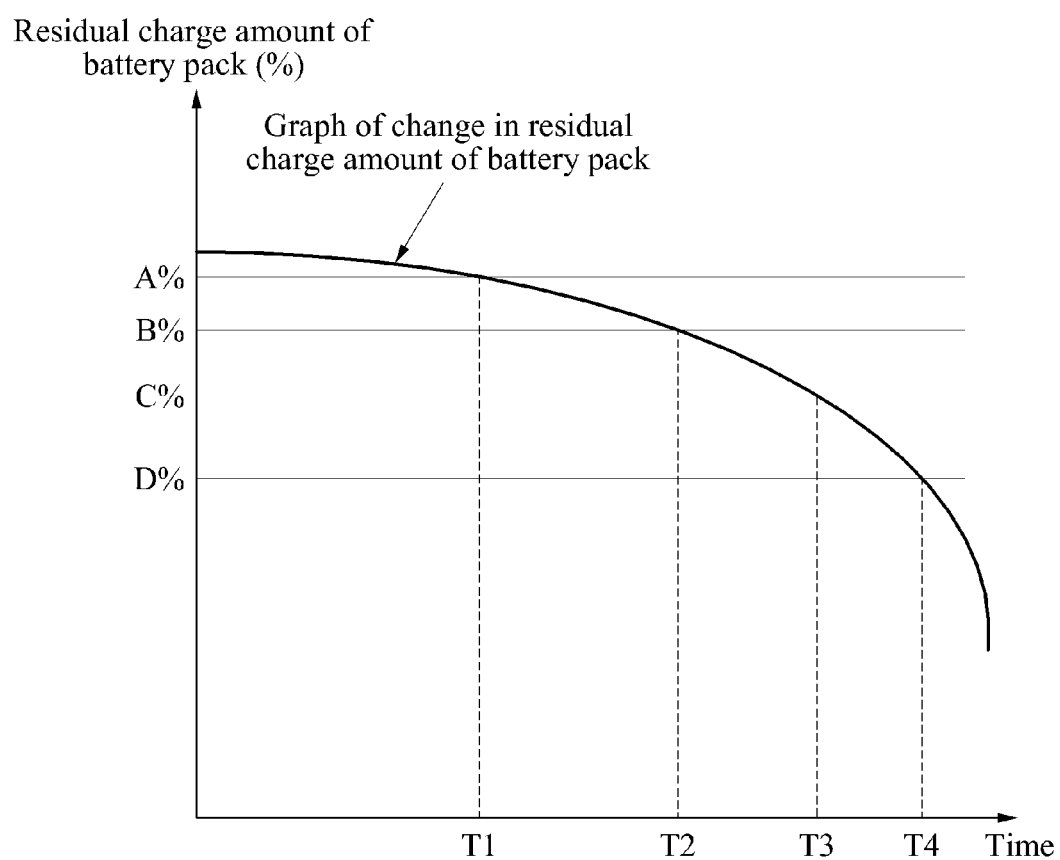
FIG. 6 is a graph illustrating an example of controlling power supply by an ESS according to an embodiment.

The exclusive supply initiation time refers to a time at which power supply to each load exclusively by the battery pack 130 is initiated, for example, a time at which exclusive power supply by the battery pack 130 is initiated. The exclusive supply termination time refers to a time at which the exclusive power supply by the battery pack 130 is terminated. The power supply timing information is used to cut power supply to at least one of loads based on a priority set based on a residual charge amount, for example, A %, B %, C %, and D % as illustrated in FIG. 6. Thus, power supply to a load having a lowest priority may be cut first. The power supply timing information may be provided in a form in which identification information of a load for which power supply is to be cut corresponds to the residual charge amount.

An example of the power supply timing information is illustrated in FIG. 6, and the power supply timing information may be prestored in the integrated controller 140 or generated by the integrated controller 140. In a case that the power supply timing information is prestored in the integrated controller 140, the power supply timing information may be suitably applied when information about each load is invariable. In a case that the power supply timing information is generated by the integrated controller 140, the power supply timing information may be suitably applied when a change in a load occurs frequently, for example, when a new load is added or a load is eliminated, and when a load used among a plurality of loads changes.

The load power controller 150 may include the loads 31 through 33 and a power path, and may operate under the control of the integrated controller 140 to control power supply to the loads 31 through 33.

Here, a plurality of loads refers to at least two loads, for example, the loads 31 through 33, and the loads 31 through 33 may be of a same power type, for example, an alternating current (AC) load using AC power and a direct current (DC) load using DC power, or at least one of the loads 31 through 33 may be of a different power type. In addition, the loads 31 through 33 may have equal power consumptions, or at least one of the loads 31 through 33 may have a different power consumption.

Detailed operations of the integrated controller 140 and the load power controller 150 will be described with reference to FIGS. 4 and 5.

The inputter 160 may include, for example, a button provided for a user to manually control ON and OFF states of power to be supplied to the loads 31 through 33. The display 170 may display a residual charge amount and a currently supplied amount of energy of a load, for example, a power consumption.

Figure 2:
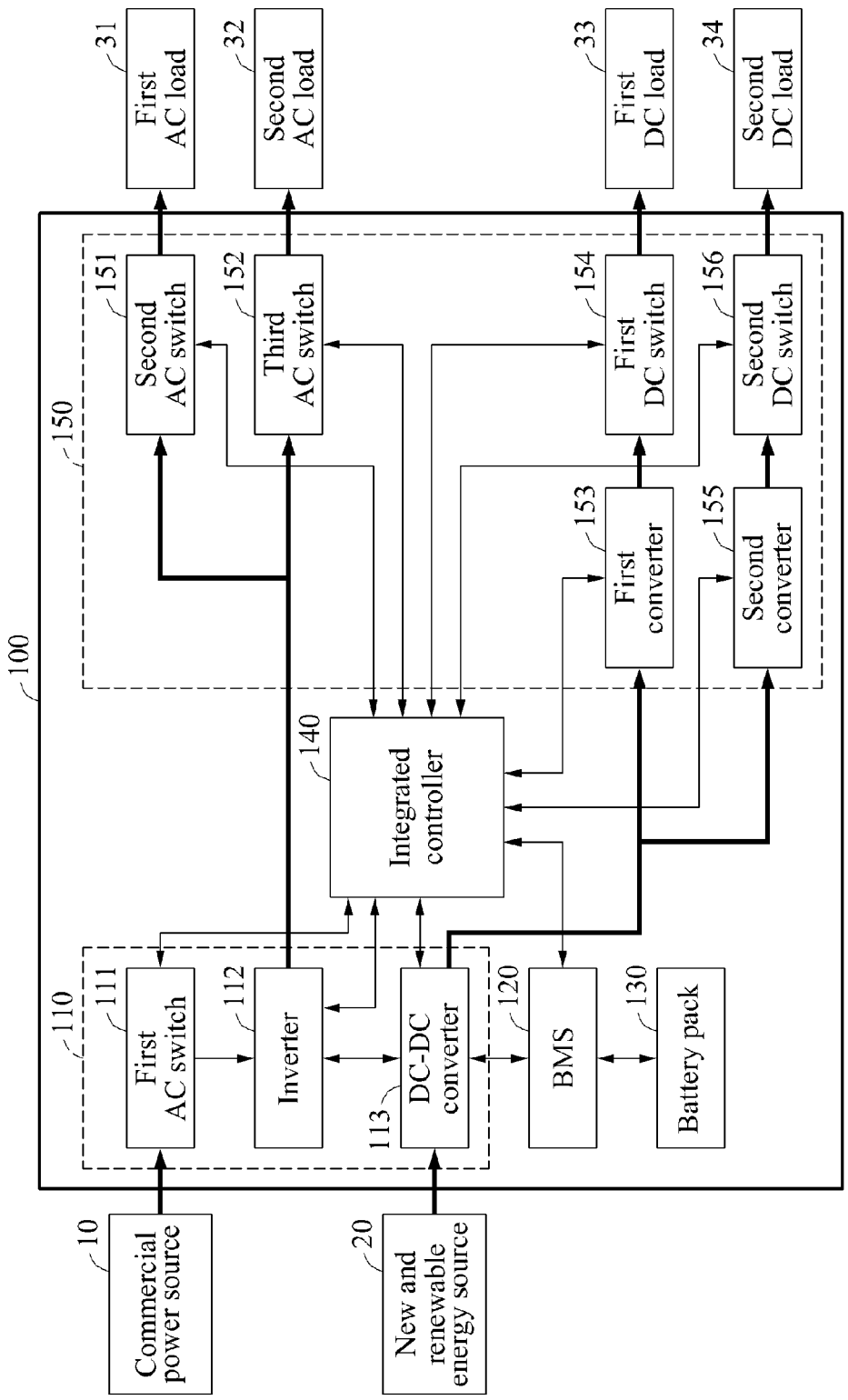
FIG. 2 is a detailed diagram illustrating an example of an ESS according to an embodiment.

Hereinafter, the ESS 100 illustrated in FIG. 1 will be described in more detail with reference to FIG. 2. As illustrated in FIG. 2, the ESS 100 uses, as an energy source, the commercial power source 10 and the renewable energy source 20. Here, the inputter 160 and the display 170 are not illustrated in FIG. 2.

In FIG. 2, power is supplied to four loads, for example, a first AC load 31, a second AC load 32, a first DC load 33, and a second DC load 34. Here, the first and the second AC loads 31 and 32 are a load device using AC power, and the first and the second DC loads 33 and 34 are a load device using DC power. The four loads 31 through 34 may have equal power consumptions or different power consumptions.

The power converter 110 may include a first AC switch 111, an inverter 112, and a DC-DC converter 113 to use the commercial power source 10 and the renewable energy source 20 as an energy source.

The first AC switch 111 may be associated with connection and disconnection to the commercial power source 10.

The inverter 112 may be coupled to the battery pack 130 and connected to the load power controller 150 through the power path. The inverter 112, which is a bidirectional inverter, may convert AC commercial power supplied through the first AC switch 111 to DC power, or convert power of the renewable energy source 20 supplied through the DC-DC converter 113 or power of the battery pack 130 to AC power.

The DC-DC converter 113 may convert DC power supplied by the renewable energy source 20 or the inverter 112 to DC power at a level suitable for the battery pack 130, or convert DC power supplied by the battery pack 130 or the renewable energy source 20 to DC power at a level suitable for a load.

The load power controller 150 may include a second AC switch 151, a third AC switch 152, a first converter 153, a first DC switch 154, a second converter 155, and a second DC switch 156.

An input terminal of the second AC switch 151 may be connected to the inverter 112, and an output terminal of the second AC switch 151 may be connected to the first AC load 31. An input terminal of the third AC switch 152 may be connected to the inverter 112, and an output terminal of the third AC switch 152 may be connected to the second AC load 32. The second and the third AC switches 151 and 152 may perform a switching operation under the control of the integrated controller 140 to determine whether to supply power to the loads 31 and 32.

The first and the second converters 153 and 155 may convert DC power input from the DC-DC converter 113 to AC power. An input terminal of the first DC switch 154 may be connected to the first converter 153, and an output terminal of the first DC switch 154 may be connected to the first DC load 33. An input terminal of the second DC switch 156 may be connected to the second converter 155, and an output terminal of the second DC switch 156 may be connected to the second DC load 34. The first and the second DC switches 154 and 156 may perform a switching operation under the control of the integrated controller 140 to determine whether to supply power to the loads 33 and 34.

Hereinafter, the ESS 100 illustrated in FIG. 1 will be described in more detail with reference to FIG. 3. As illustrated in FIG. 3, the ESS 100 uses the renewable energy source 20 as an energy source. Here, the inputter 160 and the display 170 are not illustrated in FIG. 3.

In FIG. 3, power is supplied to four loads, for example, a first AC load 31, a second AC load 32, a first DC load 33, and a second DC load 34. Here, the first and the second AC loads 31 and 32 are a load device using AC power, and the first and the second DC loads 33 and 34 are a load device using DC power. The four loads 31 through 34 may have equal power consumptions or different power consumptions.

Although the ESS 100 illustrated in FIG. 3 is configured substantially similar to the ESS 100 illustrated in FIG. 2, the ESS 100 illustrated in FIG. 3 may only use the renewable energy source 20, and thus a difference between the ESS 100 illustrated in FIG. 3 and the ESS 100 illustrated in FIG. 2 may be discovered in a configuration of the power converter 110. In detail, referring to FIG. 3, the power converter 110 includes the inverter 112 and the DC-DC converter 113. Using only the renewable energy source 20, a controlling operation performed by the integrated controller 140 may be different from the example described with reference to FIG. 2. Such a difference may be easily understood by a person having ordinary skill in the art based on the example illustrated in FIG. 2, and thus a more detailed description will be omitted here.

Hereinafter, an example of a method of improving an energy efficiency performed by an ESS will be described with reference to FIGS. 4 and 6. Here, the ESS may be one of the ESS 100 illustrated in FIG. 2 and the ESS 100 illustrated in FIG. 3. FIG. 4 is a flowchart illustrating an example of the method of improving an energy efficiency of the ESS.

Figure 4:
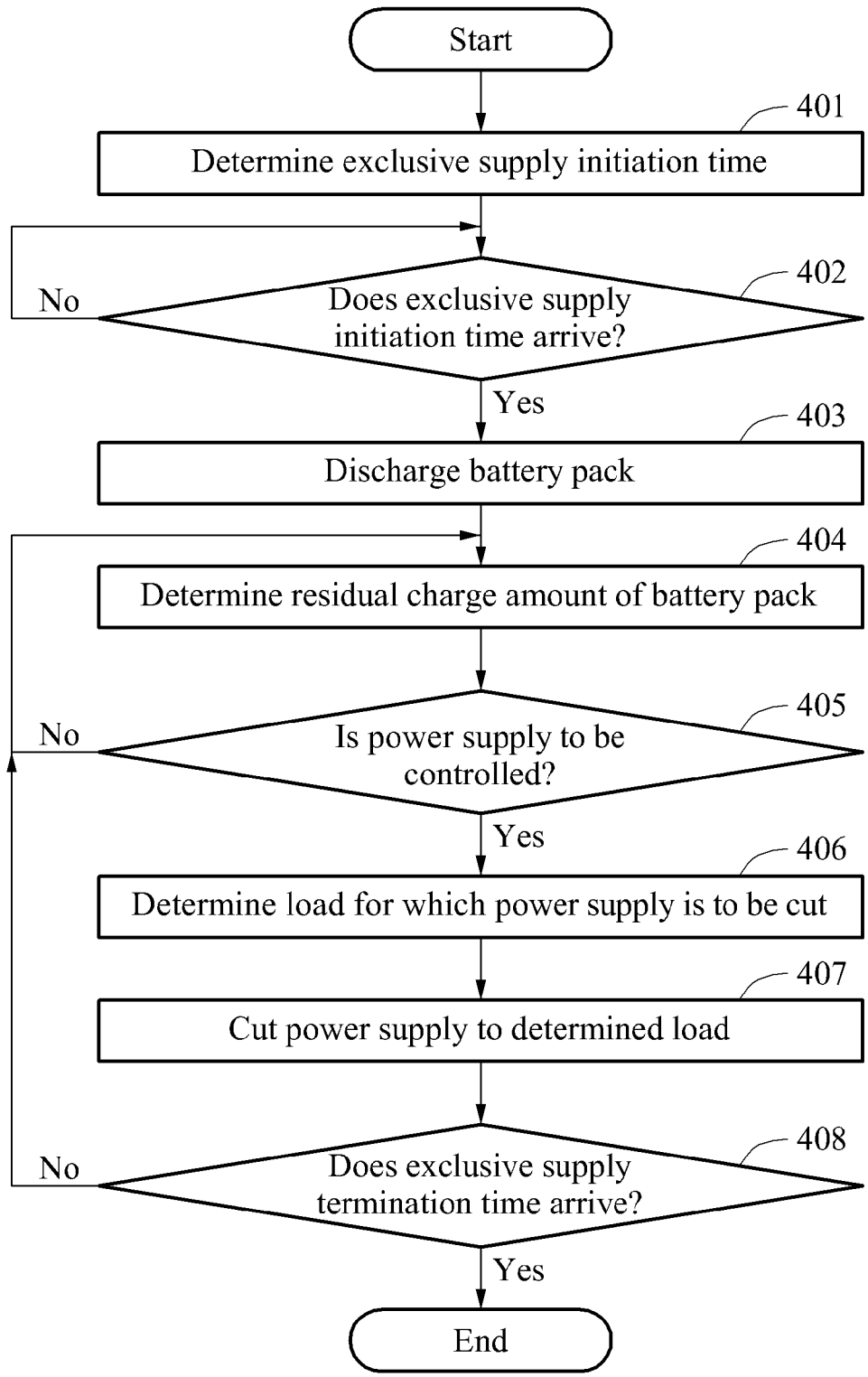
FIG. 4 is a flowchart illustrating an example of a method of improving an energy efficiency of an ESS according to an embodiment.

Referring to FIG. 4, in operation 401, the integrated controller 140 determines an exclusive supply initiation time at which the battery pack 130 exclusively supplies power to the loads 31 through 34. Here, the exclusive supply initiation time is included in prestored energy management schedule information. When the exclusive supply initiation time of the battery pack 130 is determined in operation 402, the integrated controller 140 controls the BMS 120 to discharge the battery pack 130, and controls the DC-DC converter 113, the inverter 112, and the load power controller 150 to supply power of the battery pack 130 to the loads 31 through 34 in operation 403.

In operation 404, the integrated controller 140 determines a current residual charge amount based on state information of the battery pack 130, which is continuously received from the BMS 120. In operation 405, the integrated controller 140 determines whether the current residual charge amount is a largest residual charge amount by comparing the current residual charge amount to a set residual charge amount in the power supply timing information to determine whether to control power supply.

Here, the set residual charge amount, which is included in the power supply timing information, may include, for example, A %, B %, C %, and D % as illustrated in FIG. 6.

For example, when a residual charge amount (%) at a current time T1 is greater than A %, the integrated controller 140 may determine power supply by the battery pack 130 to be stable. Conversely, when the residual charge amount at the current time T1 is less than or equal to A %, the integrated controller 140 may determine, or identify, a load having a lowest priority among the loads 31 through 34 based on the power supply timing information in operation 406, and cut power supply to the determined load in operation 407.

For example, when the load having the lowest priority is the first AC load 31, the integrated controller 140 may turn off the second AC switch 151 to cut power supply to the first AC load 31.

In operation 408, the integrated controller 140 controls the power supply as described in the foregoing until an exclusive supply termination time arrives.

For example, when a residual charge amount at a current time T2 is B %, power supply to a load having a second lowest priority may be cut. Similarly, when a residual charge amount at a current time T3 is C %, power supply to a load having a third lowest priority may be cut. When there are four loads, D % may not be set. When there are two loads to which power is to be supplied continuously, D % and C % may not be set.

Hereinafter, another example of a method of improving an energy efficiency performed by an ESS will be described with reference to FIGS. 5 and 6. Here, the ESS may be one of the ESS 100 illustrated in FIG. 2 and the ESS 100 illustrated in FIG. 3. FIG. 5 is a flowchart illustrating another example of the method of improving an energy efficiency of the ESS.

Figure 5:
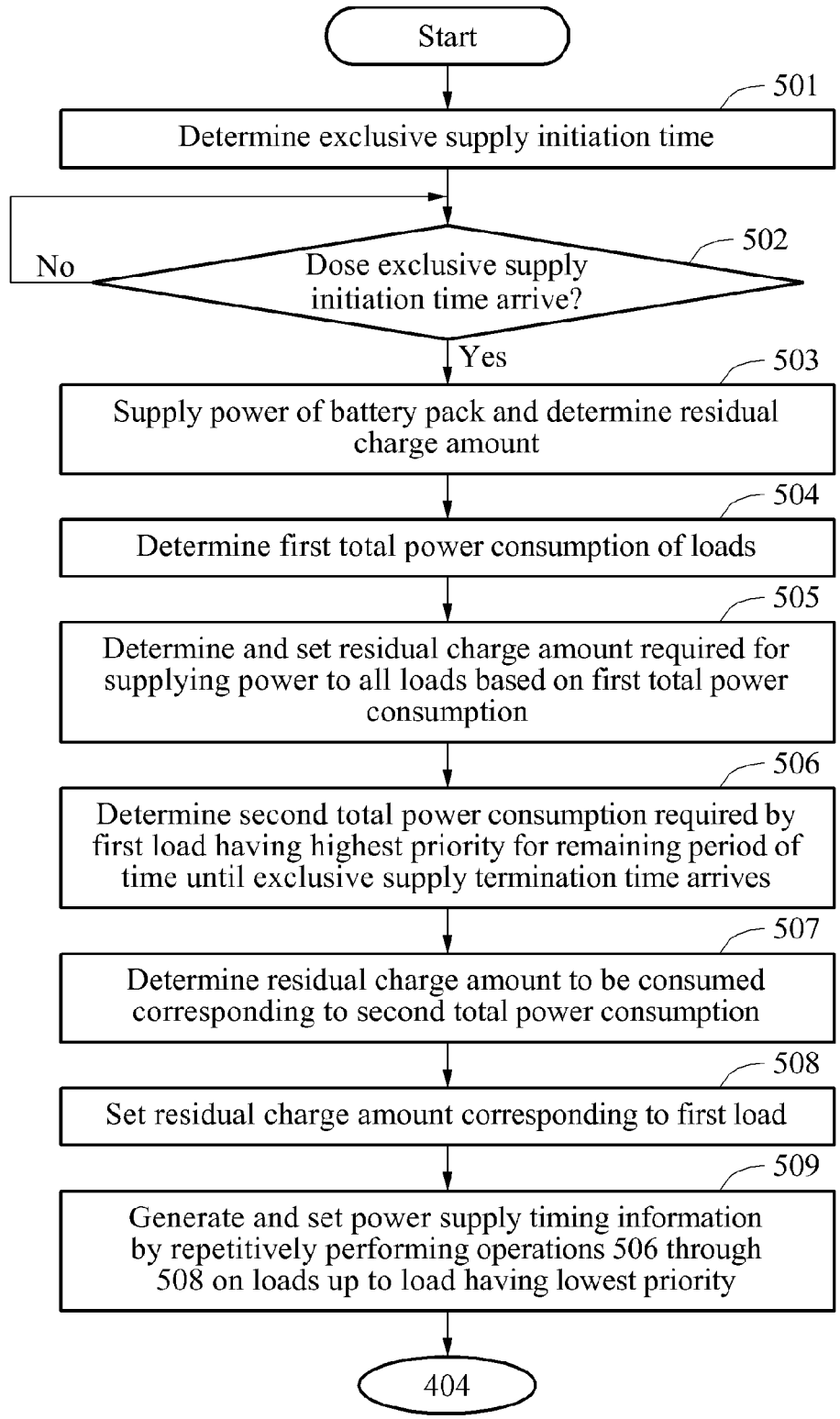
FIG. 5 is a flowchart illustrating another example of a method of improving an energy efficiency of an ESS according to an embodiment.

Referring to FIG. 5, in operation 501, the integrated controller 140 determines an exclusive supply initiation time at which the battery pack 130 exclusively supplies power to the loads 31 through 34. Here, the exclusive supply initiation time is included in prestored energy management schedule information.

When the exclusive supply initiation time of the battery pack 130 is determined in operation 502, the integrated controller 140 controls the BMS 120 to discharge the battery pack 130, and controls the DC-DC converter 113, the inverter 112, and the load power controller 150 to supply power of the battery pack 130 to the loads 31 through 34, and then determines a total residual charge amount of the battery pack 130, for example, a total amount of power remaining in the battery pack 130, in operation 503.

In operation 504, to generate power supply timing information, the integrated controller 140 determines a power consumption of each of the loads 31 through 34 based on rating information of each of the loads 31 through 34, and determines a total power consumption of the loads 31 through 34, hereinafter referred to as a first total power consumption.

In operation 505, when the first total power consumption is determined, the integrated controller 140 determines a residual charge amount corresponding to the first total power consumption, for example, a residual charge amount required for supplying power to all the loads 31 through 34, and sets the determined residual charge amount to be A % as illustrated in FIG. 6.

In response to the determined residual charge amount being greater than the total residual charge amount of the battery pack 130, the integrated controller 140 may cut power supply to a load having a lowest priority.

In operation 506, the integrated controller 140 determines a first power consumption of a first load having a highest priority, determines a remaining period of time until an exclusive supply termination time arrives, and determines a second total power consumption, which is a total power consumption required by the first load for the remaining period of time, using the first power consumption and the remaining period of time.

In operation 507, the integrated controller 140 determines a residual charge amount corresponding to the second total power consumption, which is a residual charge amount to be consumed when power is supplied to the first load for the remaining period of time. In operation 508, the integrated controller 140 sets, to be C %, the residual charge amount to be consumed for the first load.

The integrated controller 140 may perform operations 506 and 508 on a second load having a second highest priority and set B %. Here, a residual charge amount used to set B % may be a residual charge amount to be used to supply power to both the first load and the second load for the remaining period of time.

In operation 509, in a case of controlling power supply to five or more loads, the integrated controller 140 repetitively performs operations 506 through 508 on loads on a gradually lower priority basis, determines and sets a residual charge amount at which power supply is to be controlled, and generates and sets the power supply timing information.

When the power supply timing information is generated and set, the integrated controller 140 may perform operations 404 through 408 described with reference to FIG. 4.

According to example embodiments, an ESS and a method of improving an energy efficiency of the ESS, which are described herein, may efficiently supply energy to a load while monitoring an energy supply state in which the energy is supplied to the load based on an amount of power stored in a battery, despite occurrence of a situation in which power is not supplied to all loads due to a power outage and other situations, and thereby enable effective use of important apparatuses and devices even in the power outage and enable protection of a load system, security, and the like.

The above-described examples of the present disclosure may be embodied by an apparatus, a device, and a method described herein, and also by a program or non-transitory computer-readable media including the program and program instructions. Such an embodiment may be readily achieved by a person having ordinary skill in the art to which the present disclosure belongs from the description of the example embodiments provided herein.

Although a few example embodiments of the present disclosure have been shown and described, the present disclosure is not limited to the described example embodiments. Instead, it would be appreciated by those skilled in the art that changes may be made to these embodiments without departing from the principles and spirit of the present disclosure, the scope of which is defined by the claims and their equivalents.

What is claimed is:

1. An energy storage system (ESS), comprising:
   a battery pack configured to store power through a charging operation and discharge the stored power through a discharging operation;
   a power converter configured to convert a form of power input from an external power source to a form of power suitable for the battery pack or loads and output the power, or to convert a form of power input from the battery pack to a form of power suitable for the loads and output the power;
   a battery management system (BMS) configured to control the charging operation or the discharging operation of the battery pack and monitor, in real time, a residual charge amount of the battery pack;
   a load power controller coupled to the battery pack and the external power source, connected to the loads, and configured to selectively supply input power to at least one of the loads based on a switching operation; and
   an integrated controller configured to control an operation of each component, determine an exclusive supply initiation time based on energy management schedule information comprising the exclusive supply initiation time, an exclusive supply termination time, and power supply timing information, control power to be supplied to the loads exclusively using power of the battery pack at the exclusive supply initiation time, and, in response to a current residual charge amount of the battery pack being at least one residual charge amount in the power supply timing information, control power supply to one of the loads set to correspond to the residual charge amount to be cut, and
   wherein the power supply timing information comprises an order of loads among the loads for which power supply is to be cut based on a residual charge amount of the battery pack, wherein the order is set by a user, and
   the integrated controller is configured to control power supply to a load having a lower priority to be cut in response to a greater residual charge amount based on the power supply timing information.

2. The ESS of claim 1, wherein the loads are of a same power type, or at least one of the loads is of a different power type.

3. The ESS of claim 2, wherein the loads have equal power consumptions, or at least one of the loads has a different power consumption.

4. The ESS of claim 2, wherein the power supply timing information is prestored, or generated and set by the integrated controller based on a residual charge amount of the battery pack and a power consumption of each load.

5. The ESS of claim 4, wherein the external power source is a new and renewable energy source, or the new and renewable energy source and a commercial power source.

6. A method of improving an energy efficiency of an energy storage system (ESS), the method comprising:
supplying power of a battery pack to loads at an exclusive supply initiation time of energy management schedule information in which a current time is prestored;
generating power supply timing information based on a residual charge amount of the battery pack, a power consumption of each load, and an exclusive supply termination time;
monitoring and determining, in real time, a current residual charge amount of the battery pack;
comparing the current residual charge amount to at least one set residual charge amount in the power supply timing information, and determining presence or absence of a residual charge amount corresponding to the current residual charge amount;
cutting power supply to one of the loads as preset by a user in response to a determination of the presence of the residual charge amount corresponding to the current residual charge amount; and
continuously cutting power supply to one of the loads by repetitively performing the cutting of the power supply until the exclusive supply termination time arrives, and
wherein the generating of the power supply timing information comprises:
determining a total residual charge amount of the battery pack;
determining a first total power consumption by calculating a sum of respective power consumptions of the loads;
determining a first residual charge amount required to supply power to all the loads based on the first total power consumption, and matching the first residual charge amount to a load having a lowest priority among the loads to set the power supply timing information;
determining a second total power consumption required by a first load having a highest priority among the loads for a remaining period of time until the exclusive supply termination time arrives based on a power consumption of the first load and the remaining period of time;
determining a second residual charge amount corresponding to the second total power consumption, and matching the second residual charge amount to the first load to set the power supply timing information; and
performing, on a second load having a second highest priority, an operation similar to the determining of the second total power consumption and the determining of the second residual charge amount, and matching a third residual charge amount to the second load to set the power supply timing information.

7. The method of claim 6, wherein the power supply timing information comprises a set order of loads among the loads for which power supply is to be cut based on a residual charge amount of the battery pack, and
wherein the power supply timing information is used to cut power supply to a load having a lower priority in response to a greater residual charge amount.

8. The method of claim 6, wherein the loads are of a same power type, or at least one of the loads is of a different power type.

9. The method of claim 7, wherein the loads have equal power consumptions, or at least one of the loads has a different power consumption.

10. The method of claim 6, wherein the power supply timing information is prestored, or generated and set by an integrated controller based on a residual charge amount of the battery pack and a power consumption of each load.

* * * * *